INVENTOR.
ROBERT C. DENNISON
BY
ATTORNEY

COMPOSITE SIGNAL TRANSMITTING SYSTEMS

Filed March 7, 1956 2 Sheets-Sheet 2

INVENTOR.
ROBERT C. DENNISON
BY [signature]
ATTORNEY

United States Patent Office 2,929,867

Patented Mar. 22, 1960

2,929,867

COMPOSITE SIGNAL TRANSMITTING SYSTEMS

Robert Courtland Dennison, Westmont, N.J., assignor to Radio Corporation of America, a corporation of Delaware Application March 7, 1956, Serial No. 570,163

7 Claims. (Cl. 178—5.4)

The invention relates to composite signal transmitting systems and it particularly pertains to circuit arrangements for processing and eliminating undesired disturbances in transmitting composite color television signals.

There are many applications involving composite signal transmission. One example of such an application to which the invention is applicable is found in the telemetering field. Another example of such an application is found in present day color television broadcasting.

The copending U.S. patent application Serial No. 570,119, filed March 7, 1956, now Patent No. 2,877,296 granted on March 10, 1959, by R. C. Dennison and A. C. Luther, Jr. for Composite Signal Transmission Systems described an application of the invention to a television stabilizing amplifier.

The composite television color signal broadcast in accordance with U.S. standards, set forth in Federal Communications Commission, public notice No. 53-1663, of December 17, 1953, comprises a luminance signal, a chrominance signal, deflection synchronizing pulses, and color synchronizing bursts. The luminance signal is intended to have exclusive control of the luminance of the reproduced image and so corresponds to the present black-and-white, or monochrome signal. The Institute of Radio Engineers has defined the term monochrome signal as applicable to both black-and-white, or monochrome, transmission and color transmission. The chrominance signal comprises amplitude modulated sidebands of a pair of suppressed subcarrier waves generated in quadrature phase relationship with a center frequency in the higher luminance signal frequency band. The chrominance signal is modulated onto the subcarrier waves and when added to the luminance signal will be effective to reproduce the televised image in full color. The deflection synchronizing pulses are used to control the scanning of the electron beam forming the raster on the face of the kinescope in synchronism with the scanning of the electron beam in the color television camera. The color synchronizing bursts comprise approximately eight or nine cycles of unmodulated sine wave of chrominance subcarrier frequency and of reference phase which follow the horizontal deflection synchronizing pulses. The color synchronizing bursts are employed for controlling the synchronization of the color demodulating circuitry by which the chrominance subcarrier is properly demodulated to derive the chrominance signal.

In present day color television systems, it is frequently desired to relay the composite color signal from one point to another for further processing. This relaying of the composite color signal often may subject a signal to various types of interference effects which tend to distort portions, or all, of the composite signal and often may attenuate the color picture signal to such an extent that the amplitude level may be too low for the signal to be used directly. In such instances, a video signal stabilizing amplifier, popularly referred to as a "stab-amp," is used to modify the composite color signal as received from the remote point. In general, such stabilizing amplifiers include circuits for suitably amplifying the color picture signal, for restoring the deflection synchronizing pulses to their proper forms and amplitudes, and for removing low frequency disturbances such as tilt surges and hum.

The amplitude of the color bursts is approximately the same as that of the deflection synchronizing pulses before being modulated onto the visual carrier wave. As modulated onto the visual carrier wave, however, the color synchronizing bursts swing symmetrically above and below the black level, during the latter part of the blanking interval termed the "back porch."

Heretofore it has generally been considered desirable to strip the received color burst from the incoming signal and insert a new color burst derived from a local burst generating circuit. This type of stabilizing amplifier involves difficulty in maintaining a sufficiently accurate phase lock between the locally generated and the incoming color bursts. Prior art stabilizing amplifiers which do not strip the color burst almost invariably introduce phase distortion so that the color image reproduced does not conform to that transmitted.

In some television stabilizing amplifiers, the composite color signal is split into quasi-luminance and quasi-chrominance components and the deflection synchronizing pulses are clipped from the quasi-luminance signal. The deflection synchronizing pulses are separated from the composite color signal in a separate circuit while the color bursts pass through the quasi-chrominance circuits without alteration. The quasi-luminance, quasi-chrominance and color bursts, and the deflection synchronizing pulses are then added to reconstitute the composite color signal. This technique as heretofore practiced has the disadvantage that some of the higher frequency components of the deflection synchronizing pulses pass through the quasi-chrominance channel and are therefore not removed by the synchronizing pulse clipping circuit in the quasi-luminance channel. When the quasi-signals are added back together these high frequency components appear as transient voltages, or "spikes," appearing in the resultant output signal at the time of occurrence of the leading and trailing edges of the synchronizing pulses. Previous arrangements for eliminating these transients have been critical in adjustment and sometimes unstable in operation.

An object of the invention is to provide an improved stabilizing amplifier for use in color television signal broadcasting.

Another object of the invention is to provide stable means for suppressing transients in the quasi-chrominance channel of a stabilizing amplifier.

A further object of the invention is to provide an improved means for automatically maintaining the amplitude of the synchronizing portion of the composite color signal substantially constant at the input of the synchronizing pulse separating circuit.

A color television signal stabilizing amplifier incorporating circuitry according to the invention is arranged with three principal channels. The composite color signal is applied to the input of one branch or channel to separate the deflection synchronizing pulses from the composite color signal for regeneration of these pulses. The composite color signal is also applied to another branch incorporating means to separate the composite color signal into two components with respect to frequency for assignment to further channels. One of the components comprises the band of frequencies centered about the chrominance subcarrier frequency, and is sometimes called the chrominance component. Hereinafter, however, the term quasi-chrominance component will be used to more clearly indicate that the separated signal may not exactly correspond to the transmitted chrominance subcarrier. The other component comprises the overall band of video frequencies less an intermediate band of frequencies corresponding to the quasi-chrominance band. For analogous reasons, this signal component will be referred to hereinafter as the quasi-luminance component to fully indicate that the quasi-luminance signal may not exactly correspond to the transmitted luminance signal.

According to the invention passive circuitry is employed for developing a transient eliminating pulse of the proper time duration for eliminating transient voltages in the quasi-chrominance channel which are caused by component frequencies of the synchronizing pulses lying within the band of quasi-chrominance frequencies. A time delay device having a given time delay is arranged to transmit the separated deflection synchronizing pulses to synchronizing pulse amplifying circuitry and at the same time reflect a portion of the transmitted pulse image back to the input time delay device. At this point the transmitted and reflected pulses are added to form a stepped pulse of duration equal to the synchronizing pulses plus twice the given time delay and which stepped pulse overlaps the synchronizing pulses on both edges by the given delay time. This pulse is clipped to provide a pulse of uniform amplitude which is applied to a clamping circuit coupled to the quasi-chrominance channel to clamp the circuitry in this channel to a predetermined reference level at the time the transient voltages appear, effectively suppressing them. A time delay circuit is interposed in the circuitry common to both the luminance and chrominance channels so that the regenerated synchronizing pulses, the output of the quasi-chrominance channel and the output of quasi-luminance channel may be added in the proper time relationship. This delay also insures that the transient suppressing pulses start before the occurrence of a chrominance channel voltage transient, or spike, due to the leading edge of a synchronizing pulse.

In order that the advantages of the invention may be readily obtained in practice, an express embodiment of the invention, given by way of example, is described with reference to the accompanying drawing in which.

Figure 1:
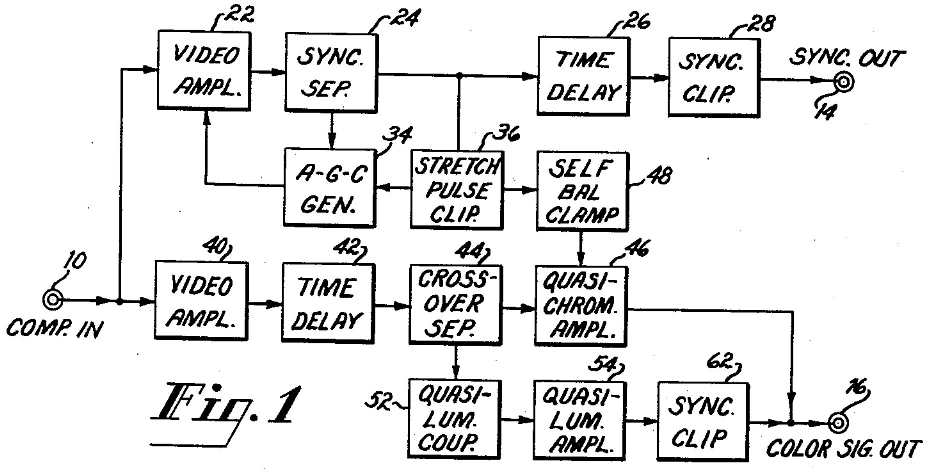
Fig. 1 is a functional diagram of a composite signal transmission system according to the invention.

Referring to Fig. 1 there is shown an example of complex wave transmission system, of a type commonly known as a stabilizing amplifier for translating a composite color signal. A composite color signal as received from a remotely located source is applied to composite color signal input terminals 10. The same composite color signal is made available at composite color signal output terminals (not shown) with regenerated deflection synchronizing pulses and amplified color picture signals and color bursts. According to the invention this result is achieved by first assigning the input composite color signal to two branches. One branch or channel serves for operation on the deflection synchonizing pulses which may be obtained at deflection synchonizing pulses output terminals 14 for application as desired. The other branch is suddivided into two channels for handling quasi-chrominance signal and quasi-luminance signals. These signals are then recombined and are available at color picture signal output terminals 16. The recombined color burst and picture signal may then be applied to a gamma correcting network for delivery to a monitor and to other apparatus requiring an output color picture signal as desired.

The deflection synchronizing signal channel comprises a video frequency amplifying circuit 22, a synchronizing signal separating circuit 24, a time delay circuit 26, and a stripped synchronizing pulse clipping circuit 28. The stripped synchronizing pulses are available at output terminals 14 for use as desired. An automatic gain control (A.G.C.) generating circuit 34 is coupled to the synchronizing separating circuit 24 to measure the peak potential of the input composite signal. The A.G.C. circuit 34 provides a direct voltage proportional to the strength of the received composite color signal for application to the video amplifying circuit 22 in the conventional manner. The input signal to the synchronizing separating circuit is thus maintained substantially independent of variations in the received signal strength.

The received composite color signal appearing at terminals 10 is applied to a video frequency amplifying circuit 40 and delayed in time substantially equal to the time delay given the synchronizing pulses in the time delay circuit 26 by means of a further time delay circuit 42. The delayed composite color signal is then applied to a cross-over filter network 44 where the signal is divided into two components on a frequency basis. The cross-over filter network comprises components adjusted to the chrominance subcarrier and those signal components of frequency centered about the chrominance subcarrier are applied to a quasi-chrominance signal amplifier 46. The signal components translated by the quasi-chrominance amplifying circuit 46 are essentially the chrominance signal and color bursts of the composite color signal together with those portions of the luminance signal lying in the same frequency band. Because of the presence of the latter signal components, the selected signal is preferably termed the quasi-chrominance signal in the interest of clarity. Higher frequency components of deflection synchronizing pulses which were present in the composite signal are transmitted through the cross-over filter network 44 and the quasi-chrominance signal amplifying circuit 46 to form voltage transients occurring in time at the leading and trailing edges of the pulses. These voltage transients extend sufficiently far in positive and negative directions to adversely affect the output signal. According to the invention the stretched pulses obtained from the clipping circuit 36 are applied to a self balancing clamping circuit 48 to clamp the quasi-chrominance signal to reference potential for the duration of the stretched pulses developed according to the invention.

The cross-over filter network 44 delivers a video frequency wave comprising the luminance signal less those components centered about the color subcarrier frequency, which were translated in the quasi-chrominance amplifying circuit 46, together with the deflection synchronizing pulses. This signal is hereinafter termed the quasi-luminance signal in the interest of clarity. This quasi-luminance signal is applied by means of a quasi-luminance coupling circuit 52 to a quasi-luminance amplifying circuit 54. The direct component (D.-C.) of the quasi-luminance signal may be re-inserted by means of a black level clamping circuit (not shown) driven by a pulse train which may be obtained from a clamping pulse generator (not shown) which is synchronized with the input composite color signal by a stretched pulse obtained from the clipping circuit 36. Such an arrangement is shown in the above mentioned copending U.S. patent application Serial No. 570,119, filed March 7, 1956, now Patent No. 2,877,296. The deflection synchronizing pulses appearing in the incoming composite color signal are removed by means of a synchronizing pulse clipping circuit 62 so that only the quasi-luminance components are available at the intermediate terminals 16 for addition to the quasi-chrominance signals obtained from the quasi-chrominance amplifying circuit 46.

Figure 2:
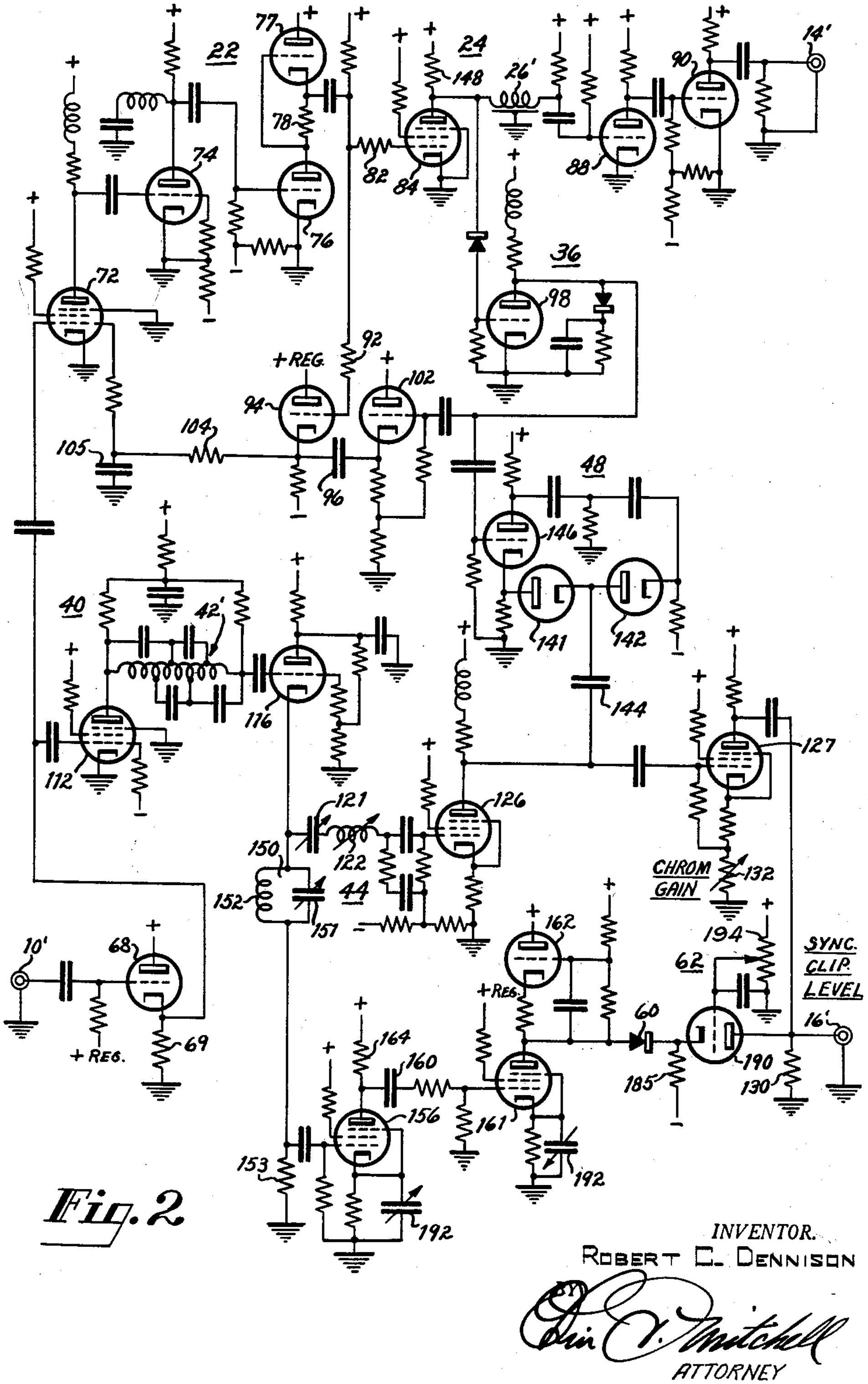
Fig. 2 is a schematic diagram of circuitry for performing the functions outlined by the diagram of Fig. 1.

An example of circuitry constituting the above described stabilizing amplifier is given in Fig. 2. The composite color signal appearing at terminals 10 is applied to a cathode follower impedance matching tube 68. The composite color signal appearing across the cathode resistor 69 is applied to the control grid of a pentode composite signal amplifying tube 72. A triode amplifying tube 74 is coupled between the anode of the initial video frequency amplifying tube 72 and the input circuit of a series tube amplifying circuit comprising two triodes 76, 77 connected in a conventional degenerative circuit having a feedback resistance element 78 connected between the anode and cathode electrodes of the tubes respectively. The amplified video signal is applied by way of a series resistor 82 to the grid of a deflection synchronizing pulse separating tube 84. The composite color signal is applied to the grid of the separating tube 84 in positive polarity whereby the grid is driven positive with respect to the cathode in the presence of the deflection synchronizing pulses. Rectification in this grid-cathode circuit effectively clamps the tips of the synchronizing pulses at approximately zero voltage, or ground. The cut-off voltage for the tube 84 is negative and the overall gain of the amplifier circuit, including the tubes 72—77, is made sufficiently great so that the separating tube 84 passes substantially less than the entire deflection synchronizing pulse. Thus the output from the synchronizing separating tube 84 consists of a train of pulses at deflection synchronizing rate.

The deflection synchronizing pulses are applied by means of a length of delay line 26′ to the input circuit of a clipping tube 88. The tips of the stripped synchronizing pulses which are usually severely distorted in transmission are then clipped by the action of the clipping tube 88 and presented to a pulse amplifying tube 90 for amplification to the desired value.

The composite video signal appearing across the cathode resistor 69 is also supplied to the control grid of a pentode video frequency amplifying tube 112. The amplified color signal is delayed in time by means of a time delay circuit 42′ may have to be more complex than equal to that of the time delay line 26′. Because of the extreme wide band of frequencies which must be translated in the quasi-chrominance channel, the time delay circuit 42 ′may have to be more complex than the simple length of delay line cable readily used in the synchronizing pulse channel. Those skilled in the art will appreciate the factors involved and utilize conventional time delay circuitry as required to suit the circumstances. The amplified and delayed composite color signal is applied to the grid circuit of a cathode follower tube 116 for proper impedance matching to the crossover filter network proper. The cathode electrode of the cathode follower tube 116 is coupled by means of an adjustable capacitor 121 and an adjustable inductor 122 forming a series resonant circuit at the chrominance subcarrier center frequency to apply a quasi-chrominance signal to the input of an amplifying pentode tube 126. This tube 126 along with another pentode tube 127 constitutes the quasi-chrominance amplifying circuit 46. The output of the final amplifier tube 127 is impressed across an output load resistance element 130. The color bursts are transmitted from the cathode of the follower tube 116 to the load resistance element 130 substantially without deviation in phase and varied in amplitude to a level determined by the setting of the chrominance channel gain control 132.

This quasi-chrominance channel also translates any and all energy of the frequency lying in the quasi-chrominance channel which includes some of the higher frequency components of the deflection synchronizing pulses of the composite video signal. These latter energy components form undesirable positive-going and negative-going voltage transients occurring in time at the leading and trailing edges of the synchronizing pulses. These voltage transients, termed "spikes" by the artisan, are removed according to the invention by clamping the anode of the initial quasi-chrominance signal amplifying tube 126 to reference potential, or ground, during the portion of the blanking interval which includes the synchronizing pulses but not the color bursts. Normally the quasi-chrominance amplifier is A.-C. coupled for translating an essentially symmetrical signal, but it may be clamped during the synchronizing pulse interval since no signal is being translated at that time. The clamping circuit 48 employed for this function comprises a pair of diode elements 141, 142 connected in series with the junction point connected by means of a capacitor 144 to the anode of the quasi-chrominance amplifying tube 126. A clamp driving tube 146 is connected to the diodes 141, 142 to pass direct current through the diode elements when the control electrode of the tube 146 is positive with respect to the cathode. When the diodes conduct the junction point is effectively brought to A.-C. reference potential, shown as ground, despite any inequality of amplitude of the applied pulses. More complete details of the construction and operation of this self balanced clamping circuit may be obtained by referring to U.S. patent application Serial No. 440,747, filed July 1, 1954, for Electronic Switching Circuitry, by A. C. Luther, Jr. The drive pulses for operating the balanced clamping circuit 48 are obtained from the stretched pulse clipping tube 98. These are the same pulses which were applied to the A.G.C. gating tube 102 as previously described.

Figure 3:
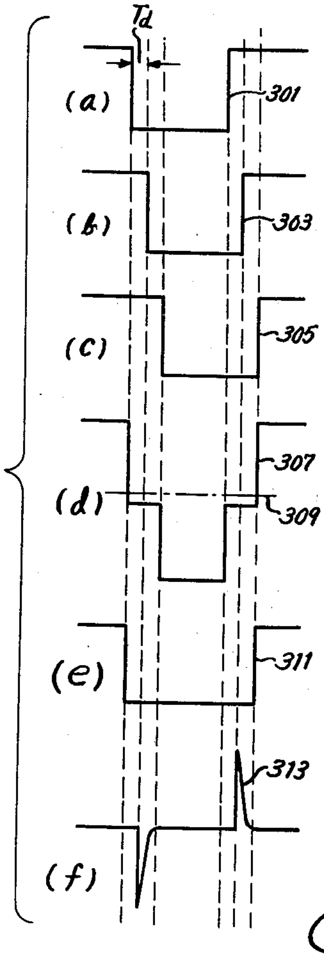
Fig. 3 is a graphical representation of waveforms obtained in connection with the transient correcting pulse generating circuit according to the invention.

While in theory unstretched synchronizing pulses might be used to excite the balanced clamp driving tube, it is evident that more stable operation may be obtained with wider drive pulses. According to the invention stretched pulses are obtained by the interposition of the delay line 26′ and timed with respect to the composite color signal by means of the time delay circuit 42′. As previously stated, the separated synchronizing pulses are applied to the input terminals of the delay line 26′ for application to the synchronizing pulse clipping tube 88. Since the output terminals of the delay line 26′ are not terminated in the characteristic impedance of the line, the stripped synchronizing pulses are reflected to the input terminals and absorbed in the load resistor 148 of the separating tube 84. Referring to Fig. 3(*a*) the curve 301 represents a stripped synchronizing pulse as impressed on the input terminals of the delay line 26′. The curve 303 of Fig. 3(*b*) represents the same stripped synchronizing pulse appearing at the output terminals, while the curve 305 in Fig. 3(*c*) represents the reflected stripped synchronizing pulse at the input terminals of the delay line 26′. The reflected pulse is then added to the original stripped synchronizing pulse to effect a stepped pulse as represented by the curve 307 in Fig. 3(*d*). The line 309 represents the clipping level of the stretched pulse clipping tube 98 which operates to produce a stretched pulse as represented by the curve 311 of Fig. 3(*e*). The curve 313 of Fig. 3 (*f*) represents the voltage transients to be suppressed. It is evident that the stretched pulse 311 is of time duration sufficiently long to clamp the quasi-chrominance amplifier channel during the period in which these voltage transients "spikes" appear. It should be noted that the stretched pulses are wider than the original stripped synchronizing pulses by twice the delay time of the delay line 26′, which is of course, equal to that of the time delay circuit 42′. The composite color signal passes through the time delay circuit 42′ whereby the voltage transients are delayed $T_d$ seconds behind the correcting synchronizing pulse so that the stripped pulse initiates at least $T_d$ seconds before the voltage transient at the leading edge of the synchronizing pulse arrives and ends $T_d$ seconds after the trailing edge has passed. Not only is the circuit arrangement both stable and foolproof due to the use of passive circuit elements, but the width of the stretched pulses automatically changes during the equalizing-vertical synchronizing interval to the proper value to remove the "spikes" occurring in synchronism with the leading and trailing edges of these pulses.

With two delay lines of the same time delay the stabilized synchronizing pulses and the color burst and picture signals are added in the proper time relationship.

The cathode circuit of the follower tube 116 also may include, as shown, a parallel resonant circuit 150 comprising an adjustable capacitor 151 and an inductor 152 and a cathode resistor 153. The circuit 150 is tuned to parallel resonance at the chrominance subcarrier center frequency to present a high impedance at the same frequencies at which the series connected capacitor 121 and inductor 122 presented a low impedance. Thus these frequencies are excluded from the quasi-luminance signal which appears across the cathode resistor 153. The quasi-luminance signal appearing across the cathode resistor 153 is applied to the input circuit of a pentode amplifying tube 156 forming a part of the quasi-luminance coupling circuit 52. The quasi-luminance signal coupling circuit 52 is shown in Fig. 2(*a*) as comprising a pentode amplifying tube 156 and a coupling capacitor 160. By means of the coupling capacitor 160 the quasi-luminance signal is applied to the input circuit of a series tube amplifying circuit comprising a pentode tube 161 and a triode tube 162. A cathode capacitor 192 provides high peaking to compensate for the capacitance in the anode circuit of the luminance amplifier 161. A feedback clamping circuit may be employed to clamp the quasi-luminance signal to black level at this point as described in the above mentioned copending U.S. patent application, Serial No. 570,119, filed March 7, 1956, now Patent No. 2,877,296.

A series connecting crystal diodle element 60' and a resistor 185 are connected to clip white going excursions of the quasi-luminance signal at the prescribed level, which is 12.5±2.5 percent under present Federal Communications Commission standards. If the anode potential of the luminance amplifier tube 161 drops in response to the signal proceeding in the white direction, the voltage across the crystal element 60' drops until it reaches zero. When the crystal element 60' stops conducting, the current through the synchronizing pulse clipping tube 190, and hence in the principal output load resistor 130, levels off at the instantaneous value of current flowing through a resistor 185.

The synchronizing pulse clipping tube 190 is direct coupled to the white clipping diode element 60' and the polarity of the quasi-luminance signal at this point is such that the synchronizing pulses extend in the positive direction, tending to reduce the current flowing through the synchroniznig clipping tube 190. By means of a potentiometer 194 the grid of the clipping tube 190 is biased so that the tube cuts off at black level leaving only the video quasi-luminance components at the anode of the clipping tube 190. The quasi-luminance and the quasi-chrominance signals are now added in the anode circuit of the clipping tube 190 in the proper proportion, as determined by the setting of the quasi-chrominance gain control 132, to reconstitute the composite color signal complete with color burst but less the deflection synchronizing pulses and free from any voltage transients, or spikes, which would interfere with the proper subsequent adding of the deflection synchronizing pulses.

Those skilled in the art will determine from the teachings herein the proper value of components to be used in applying the invention to practice, however, the values listed below, which were used in a stabilizing amplifier constructed as shown in the schematic diagrams of Fig. 2 are offered as a convenient guide.

| Ref. No. | Component | Type or Value |
|---|---|---|
| 68 | Input cathode follower | 12AT7 (par.) |
| 69 | Cathode resistor | 18 Kilohms. |
| 72, 74 | Pentode-triode amplifier | 6U8. |
| 76, 77 | Series amplifier tubes | 6BQ7A. |
| 82 | Series resistor | 220 Ohms. |
| 84 | Sync. sep. tube | 1/s. 6AW8. |
| 88 | Clipping tube | 1/s. 12AT7. |
| 90 | Sync. pulse amplifier | 1/s. 6BQ7A. |
| 92 | Series resistor | 47 ko. |
| 94 | A.G.C. generating tube | 1/s. 12AX7. |
| 96 | Charging capacitor | 0.047 mf. |
| 98 | Clipping tube | 1/s. 6 AW8. |
| 102 | A.G.C. blocking tube | 1/s. 12AX7. |
| 104 | A.G.C. filter resistor | 1 Mego. |
| 105 | A.G.C. filter capacitor | 0.068 mf. |
| 112, 116 | Pentode-triode tube | 6U8. |
| 121, 151 | Adjustable capacitor | 75–125 mmf. |
| 122, 152 | Filter inductor | 22.23 μh. |
| 126 | Pentode amplifier tube | 1/s. 6AW8. |
| 127 | do | 6CL6. |
| 130 | Bias resistor | 39 ko. |
| 132 | Chrominance channel gain control | 1 ko. |
| 141, 142 | Clamp diodes | 6AL5. |
| 146 | Clamp driving tube | 1/s. 6BQ7. |
| 148 | Load resistor | 2,700 Ohms. |
| 153 | Cathode resistor | 500 Ohms. |
| 156 | Luminance amplifier tube | 6AN8. |
| 160 | Coupling capacitor | 0.001 mf. |
| 161 | Pentode series tube | 6CL6. |
| 162 | Triode series tube | 1/s. 5687. |
| 164 | Anode resistor | 820 Ohms. |
| 185 | Clipping level resistor | 52.6 ko. |
| 190 | Sync. pulse clipper tube | 12AX7 (par.). |
| 194 | Sync. clip. level control | 50 ko. |
| 198 | Load resistor | 1 ko. |

The power supply delivered 280 volts positive between the points marked with a plus (5) sign and the point of neutral potential, shown as ground, and 150 volts regulated between the points marked +Reg. and the point of neutral potential.

The invention claimed is:

1. A color television signal transmitting system including, a composite signal input circuit to which a composite color signal is applied, a color picture signal output circuit at which is available an amplified and processed signal corresponding to the color information bearing components of said applied composite color signal, a time delay circuit coupled to said composite signal input circuit, a color picture signal picture signal separating circuit having an input coupled to said time delay circuit and an output at which a quasi-chrominance signal is available, a quasi-chrominance signal amplifying circuit having an input coupled for alternating current flow to the output of said separating circuit and having an output coupled to said color picture signal output circuit, a deflection synchronizing signal separating circuit having an input coupled to said composite signal input circuit and having an output at which the synchronizing pulses of the applied composite signal are available, a time delay device including a delay line having a characteristic impedance and having an input connected to the output of said composite synchronizing signal separating circuit and an output, said time delay device being terminated in other than said characteristic impedance whereby to transmit energy applied to the input to the output and reflect this energy back to the input with substantially the same delay time as said time delay circuit to thereby stretch in time said synchronizing pulses to produce a train of driving pulses overlapping the time interval occupied by said synchronizing pulses in said quasi-chrominance circuit, and means including a clamping circuit coupled to said quasi-chrominance signal amplifying circuit and to the output of said deflection synchronizing signal separating circuit to clamp the quasi-chrominance signal thereby to suppress any transient voltage in the quasi-chrominance amplifying circuit in response to said driving pulses.

2. A color television signal transmitting system including, a composite signal input circuit to which a composite color signal is applied, a color picture signal output circuit at which is available an amplified and processed composite color signal corresponding to the color information bearing components of said applied composite color signal, a time delay circuit coupled to said composite signal input circuit, a color picture signal separating circuit having an input coupled to said time delay circuit, said color picture signal separating circuit having two outputs, one of said signal separating circuits making available a quasi-chrominance signal and the other of said signal separating outputs making available a quasi-luminance signal and coupled to said color picture signal output circuit at which any transient voltages present at said one output are undesirable, a chrominance signal amplifying circuit having an input coupled for alternating current flow to said one output of said separating circuit and having an output coupled to said color picture signal output circuit, a composite synchronizing signal separating circuit having an input coupled to said composite signal input circuit and having an output at whch the synhcronizing pulses of the applied composite signal are available, a time delay device including a delay line having a characteristic impedance and having an input connected to said composite synchronizing signal separating circuit and an output, said time delay device being terminated in other than said characteristic impedance whereby to transmit energy applied to the input to the output and reflect this energy back to the input with substantially the same delay time as said time delay circuit to thereby stretch in time said synchronizing pulses, to produce a train of stepped driving pulses overlapping the time interval occupied by said synchronizing pulses in said quasi-chrominance circuit, a clipping circuit coupled to the input of said time delay device to clip the driving pulses, and means including a clamping circuit coupled to said chrominance signal amplifying circuit and to said pulse clipping circuit to clamp the quasi-chrominance signal and to suppress any transient voltage in the quasi-chrominance amplifying circuit in response to said clipped pulses.

3. In a composite signal transmitting system for translating a signal having synchronizing pulse portions interspersed with portions bearing other information and comprising input terminals to which said signal is applied, a signal handling channel coupled to said input terminals for further translation of at least a portion of said signal, and wherein undesirable voltage transients are developed in timed relationship to the leading and trailing edges of said synchronizing pulses, the improvement comprising means for eliminating said voltage transients, said means including means interposed between said input terminals and said signal handling channel to delay translation of said signal by a given time interval, means coupled to said input terminals to produce pulses corresponding to said synchronizing pulses, a delay line of predetermined characteristic impedance having terminals connected to said pulse producing means and a delay time substantially equal to said given time delay, said delay line being terminated in other than said characteristic impedance thereby to stretch said pulses corresponding to said synchronizing pulses, a clamping circuit having clamping terminals connected to said signal handling channel and actuating terminals coupled to the input terminals of said delay line to clamp said signal handling channel for a time greater than and overlapping the duration of said synchronizing pulses.

4. In a composite signal transmitting system for translating a signal having synchronizing pulse portions interspersed with portions bearing other information and comprising input terminals to which said signal is applied, a filter network coupled to said input terminals and arranged to divide said signal on a frequency basis, a plurality of signal handling channels coupled to said filter network for further translation of said divided signals, and a signal combining circuit coupled to said plurality of signal handling channels to reconstitute said signal and wherein undesirable voltage transients are developed in at least one of said channels in timed relationship to the leading and trailing edges of said synchronizing pulses, the improvement comprising means for eliminating said voltage transients, said means including means interposed between said input terminals and said filter network to delay translation of said signal by a given time interval, means coupled to said input terminals to produce pulses corresponding to said synchronizing pulses, a length of delay line cable terminated in other than the characteristic impedance of said delay line cable and having input terminals connected to said pulse producing means and a delay time substantially equal to said given time delay, whereby said pulses corresponding to said synchronizing pulses are reflected by the delay line cable, adding means coupled to said delay line cable input terminals to add the reflected pulses to the pulses corresponding to said synchronizing pulses to thereby stretch in time said pulses corresponding to said synchronizing pulses, a clamping circuit having clamping terminals connected to said one channel in which said voltage transients appear and actuating terminals coupled to the input terminals of said length of delay line and to said adding means to clamp said one channel continuously from a time prior to the occurrence of said synchronizing pulses to a time subsequent to said synchronizing pulses.

5. In a color television signal translating system comprising, input terminals to which a composite color television signal is applied, a filter network coupled to said input terminals and arranged to divide said signal on a frequency basis, a plurality of signal handling channels coupled to said filter network for further translation of said divided signals, and a signal combining circuit coupled to said plurality of signal handling channels to reconstitute said signal and wherein undesirable voltage transients are developed in at least one of said channels in timed relationship to the leading and trailing edges of the deflection synchronizing pulses of said composite color television signal, the improvement comprising means for eliminating said voltage transients, said means including means interposed between said input terminals and said filter network to delay translation of said composite color television signal by a given time interval, means coupled to said input terminals to separate said deflection synchronizing pulses from said composite color television signal, means including a length of delay line cable having input terminals connected to said pulse producing means, unterminated output terminals and a delay time substantially equal to said given time delay thereby to stretch said synchronizing pulses in time, means including a clamping circuit having clamping terminals connected to said channel in which said voltage transients appear and actuating terminals coupled to the input terminals of said length of delay line to clamp said one channel continuously from a time prior to the occurrence of said deflection synchronizing pulses by an amount substantially equal to said delay time to a time subsequent to said synchronizing pulses by an amount substantially equal to said delay time.

6. A circuit arrangement as defined in claim 5 and wherein clipping means are interposed between the input terminals of said length of delay line cable and the actuating terminals of said clamping means.

7. The signal transmitting system set forth in claim 4 which also includes clipping means coupled between said adding means and said actuating terminals to clip the amplitude of said stretched pulses.

References Cited in the file of this patent

UNITED STATES PATENTS

| | | |
|---|---|---|
| 2,717,276 | Schroeder | Sept. 6, 1955 |
| 2,743,310 | Schroeder | Apr. 24, 1956 |
| 2,773,930 | Richman | Dec. 11, 1956 |
| 2,793,246 | Olive et al. | May 21, 1957 |